United States Patent [19]

Lammers et al.

[11] Patent Number: 4,957,180

[45] Date of Patent: Sep. 18, 1990

[54] GUARD ASSEMBLY FOR A VEHICLE

[75] Inventors: Bryan G. Lammers, Washington; Kenneth V. Blaha, East Peoria, both of Ill.

[73] Assignee: Caterpillar Inc., Peoria, Ill.

[21] Appl. No.: 379,767

[22] Filed: Jul. 14, 1989

[51] Int. Cl.⁵ ............................................. B62D 25/20
[52] U.S. Cl. .................................... 180/69.1; 280/770
[58] Field of Search ...................... 180/69.1, 299, 298, 180/346; 280/770

[56] References Cited

U.S. PATENT DOCUMENTS

| | | | |
|---|---|---|---|
| 925,783 | 6/1909 | Miller | 180/69.1 |
| 1,182,378 | 5/1916 | Jewell | 180/69.1 |
| 3,670,835 | 6/1972 | Ross et al. | 180/69 |
| 3,779,330 | 12/1973 | Longpre | 180/69.1 |
| 3,826,327 | 7/1974 | Stover | 180/69.1 |
| 3,866,939 | 2/1975 | Fanslow | 180/69.1 |
| 3,874,624 | 4/1975 | Gianessi | 248/200 |
| 3,927,729 | 12/1975 | Gianessi | 180/69.1 |
| 3,993,153 | 11/1976 | Hansen | 180/69.1 |
| 4,770,262 | 9/1988 | Yasanuga et al. | 180/69.1 |

*Primary Examiner*—David M. Mitchell
*Attorney, Agent, or Firm*—Claude F. White

[57] ABSTRACT

A guard assembly for protecting lower portions of an earthmoving vehicle, such as the engine, transmission, and drive train, includes a guard plate which is held captive within a first space defined by sidewalls and endwalls of the vehicle frame. The guard plate can move within predetermined limits in longitudinal and lateral directions within the first space. Prior art lower guard assemblies utilize threaded fasteners to secure the guards directly to the vehicle frame. This produces loosening and breakage of the threaded fasteners when the vehicle frame flexes and twists. The subject guard assembly allows the guard plate to move slightly as the vehicle frame flexes and twists. Since the threaded fasteners holding the guard plate in place do not penetrate the guard plate, the threaded fasteners are not overstressed or slipped at the joint interfaces.

10 Claims, 3 Drawing Sheets

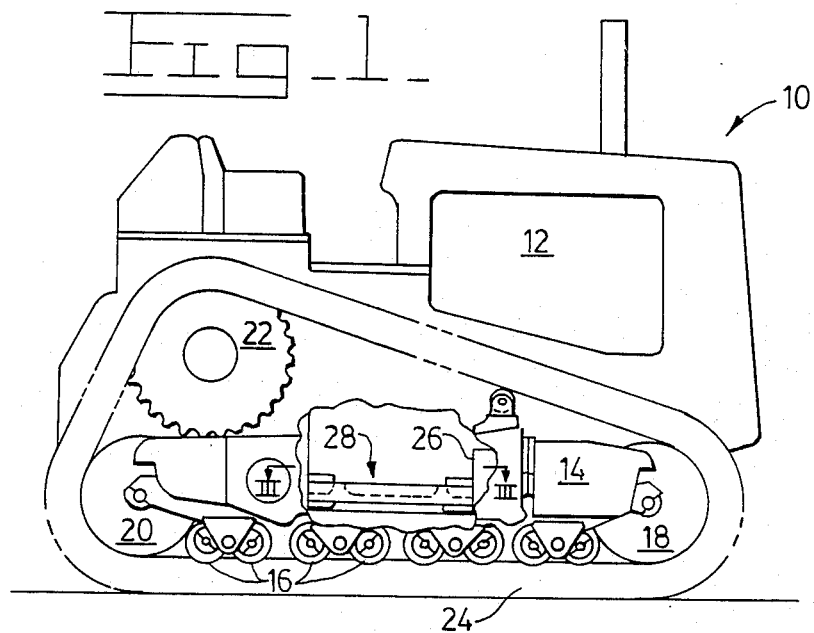
Fig_1_
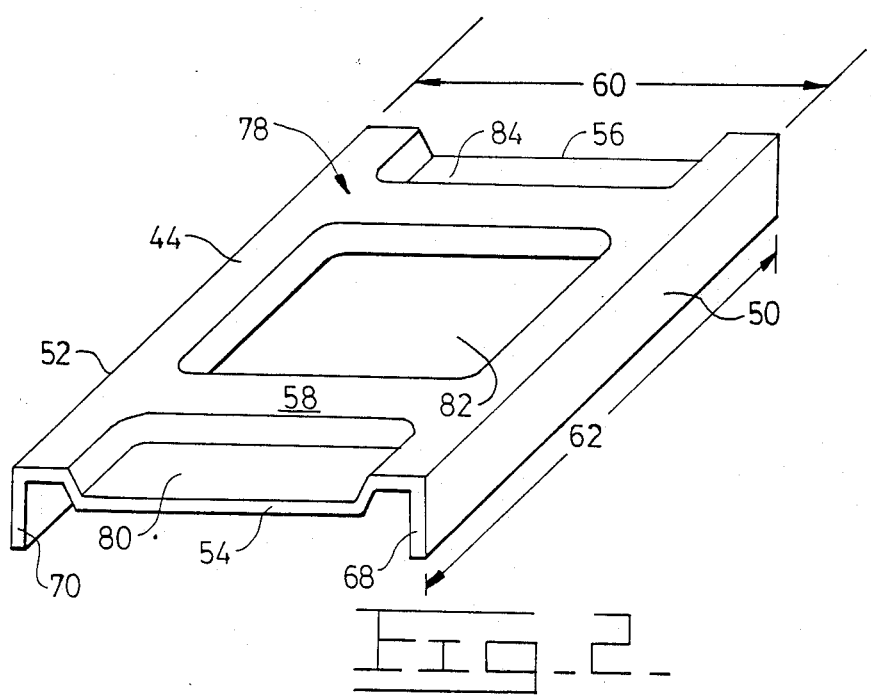
Fig_2_

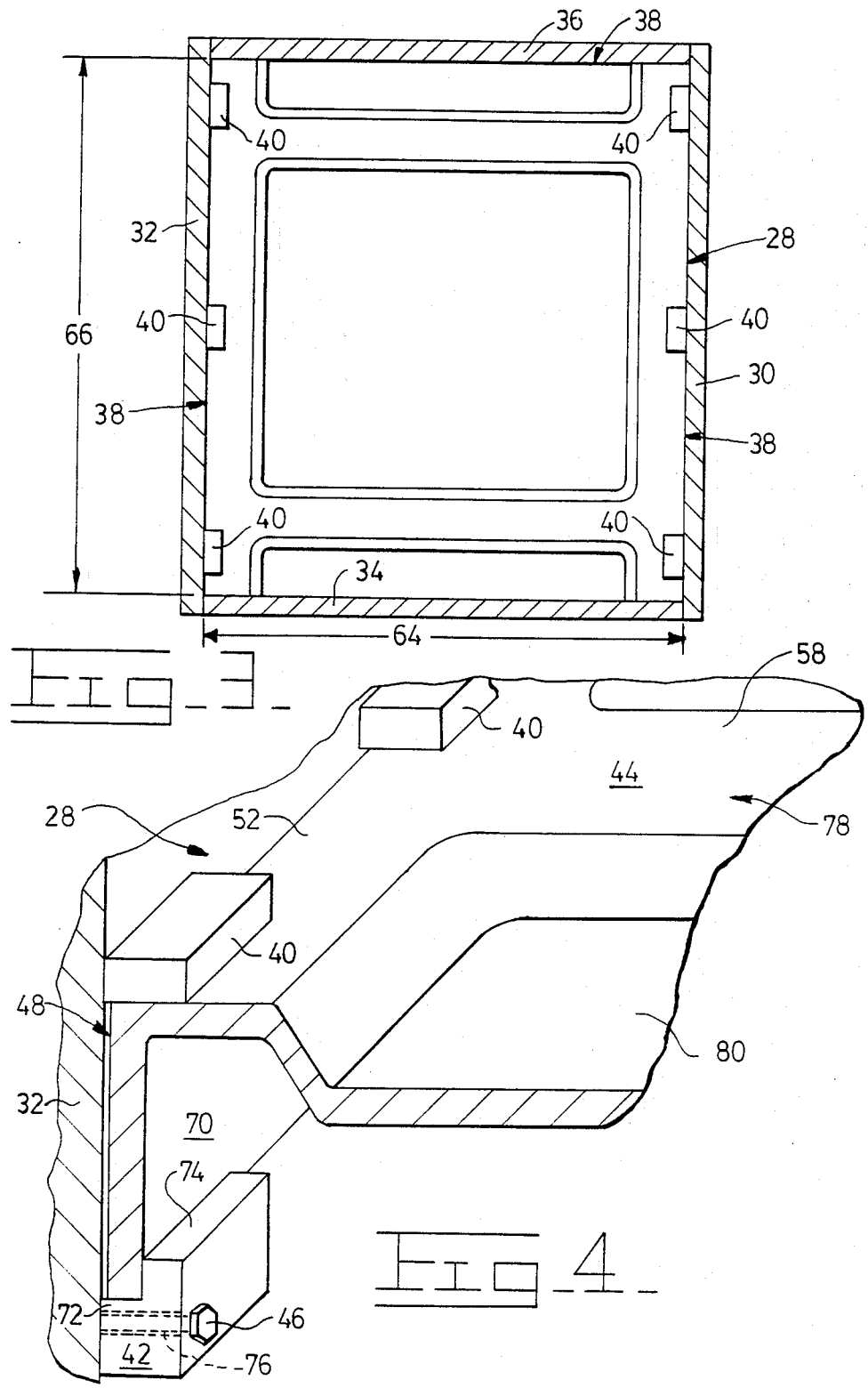

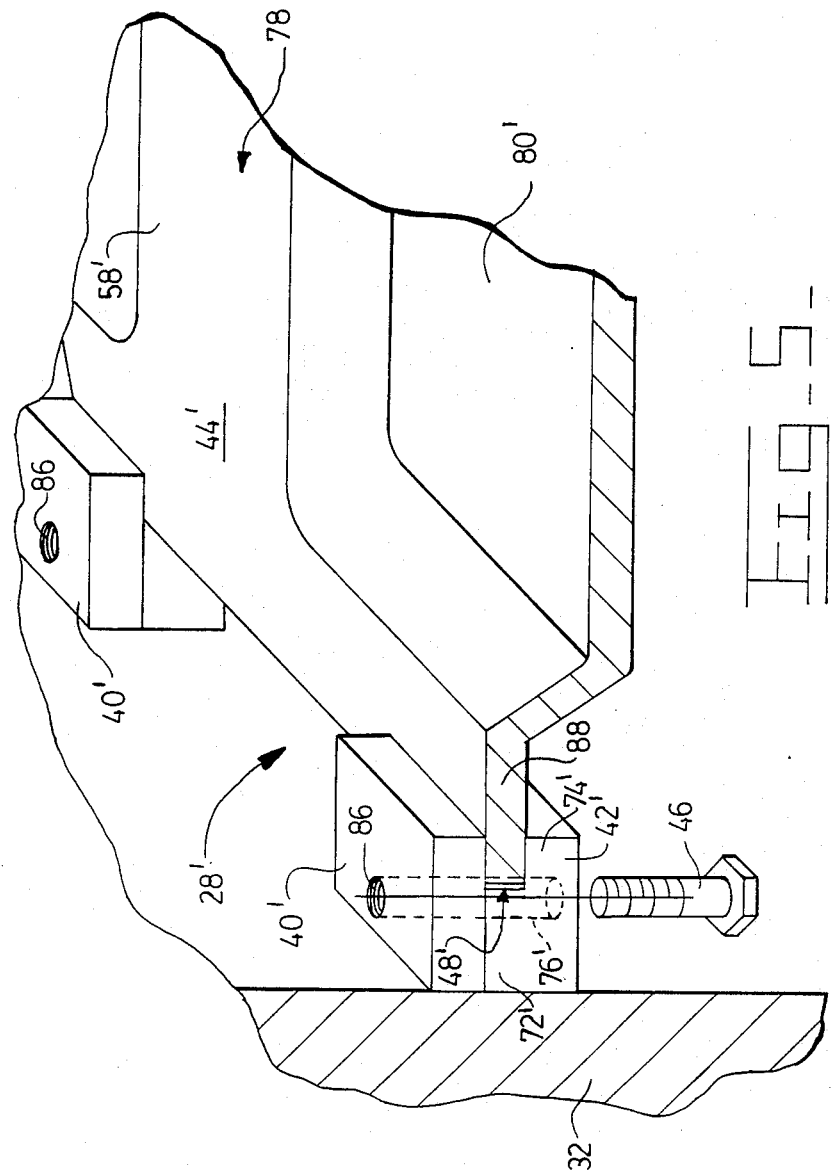

GUARD ASSEMBLY FOR A VEHICLE

TECHNICAL FIELD

This invention relates generally to a guard assembly for a vehicle and more particularly to a bottom guard assembly which encloses a space defined by frame members of the vehicle.

BACKGROUND ART

Earthmoving vehicles, such as track-type tractors, utilize various types of guards to protect vulnerable portions of the vehicle. One particular type of guard is a bottom guard which is secured to the bottom of an earthmoving vehicle to protect portions of the engine, transmissions, or other vital vehicle components. This type of guard is generally bolted directly to frame members of the vehicle, or to drilled and tapped blocks which are welded to the frame members. The bolts are generally aligned vertically and, due to flexure of the frame members during vehicle operation, the bolts are loaded in shear. This frame flexure, and movement of the guard during vehicle work operations, tends to loosen the bolts. If the bolts are not re-tightened, the guards may come completely detached from the vehicle, thereby exposing vital components to possible damage. Shear loading of the bolts can also occur when the guards hit or slide over objects, such as rocks or stumps. This sliding action produces wear of the bolt leads, making removal of the bolts difficult.

One type of bottom guard arrangement for a vehicle is shown in U.S. Pat. No. 3,993,153, issued Nov. 23, 1976, to David D. Hansen et al. The guard arrangement described in this patent includes front and rear guard members bolted to the vehicle frame and an intermediate guard member supported in a notch by the front guard and bolted to the rear guard. A plurality of shear blocks are welded to the front and rear guard members and any lateral or longitudinal applied to the intermediate guard are absorbed by the shear blocks rather than being applied to the bolts. Although this guard arrangement would appear to prevent shear loading of the bolts which secure the intermediate guard, it is a rather bulky and complicated arrangement requiring a considerable number of parts.

Another type of guard and connector assembly is shown in U.S. Pat. No. 3,874,624, issued Apr. 1, 1975, to Albert Gianessi. The belly-type engine guard described in this patent is held in place by a connector assembly to the main frame of the vehicle. The connector assembly includes a plurality of brackets welded to the vehicle frame and a plurality of connector nuts adapted to mate with portions of the brackets. Threaded bolts penetrate the guard and mat with the connector nuts to hold the guard in place. Additionally, the connector assembly includes a plurality of shear blocks welded to the vehicle frame and mating tapered openings in the guard and reinforcing blocks welded to the guard. The shear blocks are intended to transfer relatively large horizontal forces exerted on the guard directly to the frame members to avoid shearing of the threaded bolts. As with the above previously described patent, this connector assembly relies on shear blocks to relieve the bolts of the shear forces. The heads of the threaded bolts of this connector assembly are exposed to wear and will prevent easy removal of the bolts.

The present invention is directed to overcoming one or more of the problems as set forth above.

DISCLOSURE OF THE INVENTION

In one aspect of the present invention, a guard assembly for a vehicle includes a plurality of stop blocks, a plurality of retaining brackets, and a guard plate. The vehicle has a frame having first and second sidewalls and first and second endwalls with the sidewalls and endwalls defining a first space therebetween. Each of the stop blocks is connected to one of the sidewalls or the endwalls at a first preselected elevational position. Each of the retaining brackets is connectable to one of the sidewalls or the endwalls at a second preselected elevational position, and the guard plate is adapted to be positioned within the first space. The guard plate is maintained within this position by the stop blocks and the retaining blocks and is capable of limited longitudinal and lateral movement.

Earthmoving and construction vehicles, such as track-type tractors, operate on extremely rough terrain and in all types of soil conditions. It is important that vulnerable portions of the vehicle, such as the engine, transmission, and drive train be protected from contact with rocks, tree stumps, and other debris. Various types of high strength guards and plates have been utilized for the purpose of protecting the vehicle components from damage. Many of these guards are bolted to the vehicle frame with the volts being subject to wear, loosening, and breakage due to contact with rocks and other debris, and also due to twisting and flexure of the vehicle frame. When the guard securing bolts become worn or broken, they must be replaced or the entire guard may become detached from the vehicle. Servicing and replacing the prior art fastening bolts is time consuming and costly.

The subject guard assembly provides a solution to the above noted problems by securing the guard to the vehicle frame in a manner that provides limited longitudinal and lateral movement of the guard. The securing bolts of the guard assembly are not subjected to shear forces or to accelerated wear.

BRIEF DESCRIPTION OF THE DRAWINGS

FIG. 1 is a diagrammatic side elevational view, partly in section, of a track-type vehicle incorporating a guard assembly of the present invention;

FIG. 2 is a diagrammatic perspective view of a guard plate of the present invention;

FIG. 3 is a diagrammatic plan view, partly in section, showing the guard assembly in place within the confines of a vehicle frame, taken generally along the lines III—III of FIG. 1.

FIG. 4 is a diagrammatic perspective view of a portion of the guard assembly of the present invention; and FIG. 5 is a diagrammatic perspective view, similar to FIG. 4, showing an alternate embodiment of the present invention.

BEST MODE FOR CARRYING OUT THE INVENTION

With reference to the drawings, a vehicle 10, such as a track-type tractor 10, has an engine 12, a track roller frame 14, a plurality of guide rollers 16, first and second idler wheels 18,20, a sprocket wheel 22, and an endless track 24 encircling the rollers 16, the idler wheels 18,20, and the sprocket wheel 22. The vehicle 10 further includes a main frame 26 which provides support for many of the vehicle components, including the engine 12 and a guard assembly 28. The frame 26 has first and second sidewalls 30,32 and first and second endwalls 34,36 with a first space 38 defined therebetween.

The guard assembly 28 includes a plurality of stop blocks 40, a plurality of retaining brackets 42, a guard plate 44, and a plurality of threaded fasteners 46. Each of the stop blocks 40 is connected, as by welding, to either the first and second sidewalls 30,32 or to the first and second endwalls 34,36. Preferably, two of the stop blocks 40 are welded to the first sidewall 30 and two stop blocks are welded to the second sidewall 32. The stop blocks on each respective sidewall 30,32 are spaced apart horizontally and secured at a preselected first elevational position. In a similar manner, each of the retaining brackets 42 is releasably connectable to either the first and second sidewalls 30,32 or to the first and second endwalls 34,36. Preferably, two of the brackets 42 are secured to the first sidewall 30 and two brackets 42 are secured to the second sidewall 32. The brackets 42 for each respective sidewall 30,32 are spaced apart horizontally and secured by the threaded fasteners 46 at a preselected second elevational position, with the second position being elevationally lower than the first position. Each of the brackets 42 is substantially directly below one of the stop blocks 40 with a second space 48 being defined therebetween.

The guard plate 44 has first and second side portions 50,52, first and second end portions 54,56, and a central body portion 58. The guard plate 44 is positioned within the first space 38 and maintained in this position by the stop blocks 40 at the top and by the retaining brackets 42 at the bottom. The overall dimensions of the guard plate 44 are slightly smaller than the dimensions of the first space 38 so the guard plate 44 is moveable within predetermined limits in longitudinal and lateral directions. The overall dimensions of the guard plate 44 are determined by the first and second side portions 50,52 which define a first outside dimension 60 therebetween and by the first and second end portions 54,56 which define a second outside dimension 62 therebetween. The dimensions of the first space 38 are established by the first and second sidewalls 30,32, which define a first distance 64 therebetween, and by the first and second endwalls 34,36, which define a second distance 66 therebetween. Movement of the guard plate 44 in the longitudinal and lateral directions is provided since the first outside dimension 60 is less than the first distance 64 and the second outside dimension 62 is less than the second distance 66.

The first and second side portions 50,52 include respectively first and second legs 68,70 which extend outwardly away from the central body portion 58. Each of the legs 68,70 is positioned within one of the second spaces 48 and is held in this position by the retaining brackets 42, which are secured to the sidewalls by the threaded fasteners 46. Each of the retaining brackets 42 has first and second projections 72,74 with the first projection 72 contacting one of either the sidewalls 30,32 or the endwalls 34,36, and the second projection 74 contacting one of the legs 68,70. Each of the retaining brackets 42 has at least one through hole 76, which the threaded fasteners 46 penetrate to secure the retaining brackets 42 to the sidewalls 30,32.

The control body portion 58 of the guard plate 44 has a surface portion 78 including a plurality of recessed pockets 80,82,84. The guard plate 44 is preferably formed by a pressing or stamping operation and the pockets 80,82,84 add strength to the finished guard plate 44. The first and second legs 68,70, extend from the surface portion 78 at an angle of substantially 90°.

With particular reference to FIG. 5, an alternate embodiment of the invention is illustrated. In this embodiment, elements which are similar to those shown in the other drawings are indicated by the same number with a prime symbol. The retaining brackets 40' have at least one threaded hole 86 and the stop blocks 42' are releasably secured to the retaining brackets 40' by the threaded fasteners 46. The guard plate 44' has a pair of legs 88 which extend outwardly of the surface portion 78' and in substantially the same plane as the surface portion 78'. The legs 88 extend into the second space 48' and are maintained in this position by the stop blocks 40' and the retaining brackets 42'. The through holes 76' in the retaining brackets 42' are oversized and larger than the diameter of the threaded fasteners 46. This provides that the retaining brackets 42' can be assembled against the sidewalls 30,32 to prevent shearing loads from sliding the retaining brackets 42'. By preventing such sliding, horizontal shearing loads will not shear the threaded fasteners 46.

INDUSTRIAL APPLICABILITY

With reference to the drawings, the subject guard assembly 28 is particularly useful with earthmoving and construction vehicles, such as vehicle 10. The guard assembly 28 includes a guard plate 44 which is used as a bottom guard to protect vulnerable portions of the vehicle, such as the engine, transmission, or drive train. The guard plate 44 prevents rocks, dirt, tree stumps, and other debris from coming into contact with the above noted vehicle components.

The stop blocks 40 are secured, as by welding to the sidewalls 30,32 of the vehicle at a predetermined elevational position. The guard plate 44 is placed in position in the first space 38 with the surface portion 78 contacting the stop blocks 40. The retaining brackets 42 are now positioned against the sidewalls 30,32 and against the legs 68,70 and the threaded fasteners are inserted through holes 76 in the retaining brackets 42. The threaded fasteners 46 engage threaded holes in the sidewalls 30,32 to secure the retaining brackets 42 to the sidewalls 30,32 and to hold the legs 68,70 in the second space 48. With the guard plate 44 secured in this manner, it is free to move within predetermined limits in longitudinal and lateral directions. As the vehicle 10 performs its work function, the frame members, such as sidewalls 30,32 and endwalls 34,36 flex or twist slightly. Since the guard plate 44 is not firmly fastened to the vehicle frames members, but is held captive, the guard plate 44 moves slightly to accommodate the frame motion. The threaded fasteners 46 are therefore not overstressed by the frame movement and are not subject to loosening or breakage. The guard plate 44 also helps reduce overall flexing of the frame members, such as the sidewalls 30,32 and thereby extends the useful life of the vehicle frame. The increased surface area of the guard plate 44, provided by the recessed pockets 80,82,84, is helpful in achieving this function. Since the threaded fasteners 46 do not connect the guard plate 44 directly to the sidewalls 30,32, forces applied to the frame or the guard plate 44 are not transmitted directly to the threaded fasteners 46.

To remove the guard plate 44 for servicing the vehicle components protected by the guard plate 44, the threaded fasteners 46 are removed, the retaining brackets 42 are removed, and the guard plate 44 is released from its protective position and removed.

Other aspects, objects and advantages of this invention can be obtained from a study of the drawings, the disclosure and the appended claims.

I claim:

1. A guard assembly for a vehicle having a frame having first and second sidewalls and first and second endwalls, said sidewalls and endwalls each having an inner surface and defining a first space therebetween, said guard assembly comprising:
   a plurality of stop blocks, each block being connected to a respective inner surface of one of said sidewalls and said endwalls at a preselected first elevational position;
   a plurality of retaining brackets, each bracket being in contact with and connectable to one of the inner surfaces of said sidewalls and said endwalls at a preselected second elevational position, said second position being elevationally lower than said first position, each of said stop blocks and each of said retaining brackets defining a second space therebetween; and
   a guard plate having first and second side portions, first and second end portions, and a central body portions, said guard plate adapted to be positioned completely within said first space and maintained substantially in said position by said stop blocks and said retaining brackets, said guard plate being moveable within said first and second spaces and within predetermined limits in longitudinal and lateral directions.

2. The guard assembly, as set forth in claim 1, wherein each of said first and second side portions includes a leg extending away from said central body portion.

3. The guard assembly, as set forth in claim 2, wherein each of said legs is adapted to be positioned within one of said second spaces.

4. The guard assembly, as set forth in claim 1, wherein said first and second sidewalls define a first distance therebetween and said first and second endwalls define a second distance therebetween, said first and second side portions define a first outside dimension therebetween and said first and second end portions define a second outside dimension therebetween, said first outside dimension being less than said first distance and said second outside dimension being less than said second distance.

5. The guard assembly, as set forth in claim 1, wherein said retaining brackets are releasably secured to one of said sidewalls and said endwalls.

6. The guard assembly, as set forth in claim 1, wherein each of said retaining brackets is releasably secured to one of said stop blocks.

7. The guard assembly, as set forth in claim 1, wherein each retaining bracket has a through hole, and including a plurality of threaded fasteners, at least one fastener adapted to penetrate each through hole and releasably secure each retaining bracket to one of said sidewalls and said stop blocks.

8. The guard assembly, as set forth in claim 1, wherein said guard plate has a surface portion and first and second legs, said surface portion having a plurality of recessed pockets, and said legs extending from said surface portion at an angle of substantially 90°.

9. The guard assembly, as set forth in claim 1, wherein said guard plate has a surface portion and first and second legs, said surface portion having a plurality of recessed pockets, and said legs extending outwardly of said surface portion and in substantially the same plane as said surface portion.

10. A guard assembly for a vehicle having a frame having first and second sidewalls and first and second endwalls, said sidewalls and endwalls each having an inner surface and defining a first space therebetween, said guard assembly comprising:
   a plurality of stop blocks, each block being connected to a respective inner surface of one of said sidewalls and said endwalls at a preselected first elevational position;
   a plurality of retaining brackets, each bracket being connectable to one of the inner surfaces of said sidewalls and said endwalls at a preselected second elevational position, said second position being elevationally lower than said first position, each of said stop blocks and each of said retaining brackets defining a second space therebetween;
   a guard plate having first and second side portions, first and second end portions, and a central body portion, said guard plate adapted to be positioned within said first space and maintained substantially in said position by said stop blocks and said retaining brackets, said guard plate being moveable within predetermined limits in longitudinal and lateral directions; and
   wherein each retaining bracket has first and second projections, and first projection being adapted to contact the inner surface of one of said sidewalls and said endwalls, and said second projection being adapted to contact one of said side portions.

* * * * *